United States Patent [19]
Conforti et al.

[11] Patent Number: 4,467,263
[45] Date of Patent: Aug. 21, 1984

[54] RECHARGEABLE BATTERY-POWERED FLASHLIGHT SYSTEM

[75] Inventors: Frederick J. Conforti, Aurora; Kenneth R. Fenne, Glen Ellyn, both of Ill.

[73] Assignee: Pittway Corporation, Aurora, Ill.

[21] Appl. No.: 462,550

[22] Filed: Jan. 31, 1983

[51] Int. Cl.³ .............................................. H02J 7/00
[52] U.S. Cl. ...................................................... 320/2
[58] Field of Search ............................................ 320/2

[56] References Cited

U.S. PATENT DOCUMENTS

| | | | |
|---|---|---|---|
| 2,995,695 | 8/1961 | Reich | 320/2 |
| 3,458,794 | 7/1969 | Bohnstedt et al. | 320/2 |
| 3,513,290 | 5/1970 | Burley et al. | 320/2 |
| 4,191,917 | 3/1980 | Brown et al. | 320/2 |

FOREIGN PATENT DOCUMENTS 1017703 10/1957 Fed. Rep. of Germany .
1069286 11/1959 Fed. Rep. of Germany .
191368 9/1964 Sweden .

*Primary Examiner*—William M. Shoop
*Assistant Examiner*—Anita M. Ault
*Attorney, Agent, or Firm*—Emrich & Dithmar

[57] ABSTRACT

A rechargeable battery-operated flashlight system includes a housing for the flashlight, batteries and associated circuitry. A two-pronged plug is rotatably mounted in the housing for movement between two positions, the prongs projecting outwardly through an opening in the housing so that in one position they project into a recess formed by a reentrant portion of the housing and in the other position they project away from the recess. Resilient contacts connect the prongs to the rest of the circuitry, and engage in detents on the prongs in their two positions to inhibit rotation thereof. A wall bracket defines a pocket for releasably accommodating a receptacle fixture for receiving the plug prongs in their one position and for supporting the housing during recharging. In their other position, the prongs can be plugged directly into an AC wall outlet.

17 Claims, 11 Drawing Figures

U.S. Patent  Aug. 21, 1984  Sheet 1 of 2  4,467,263
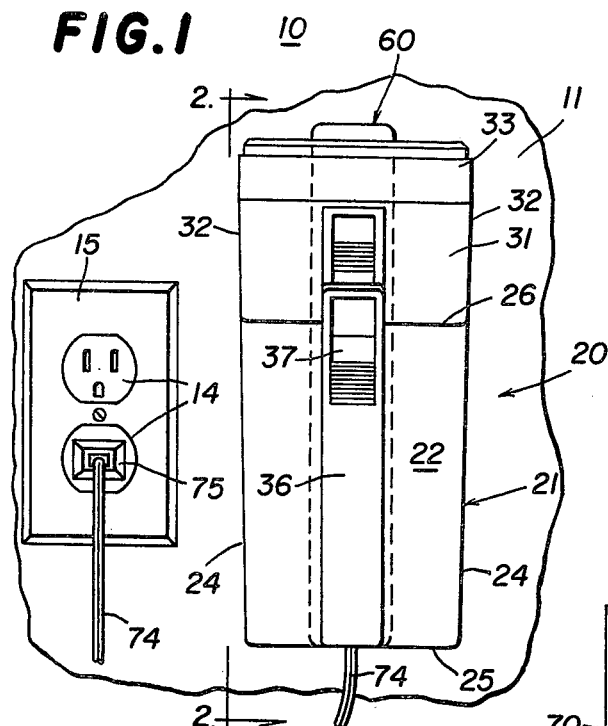
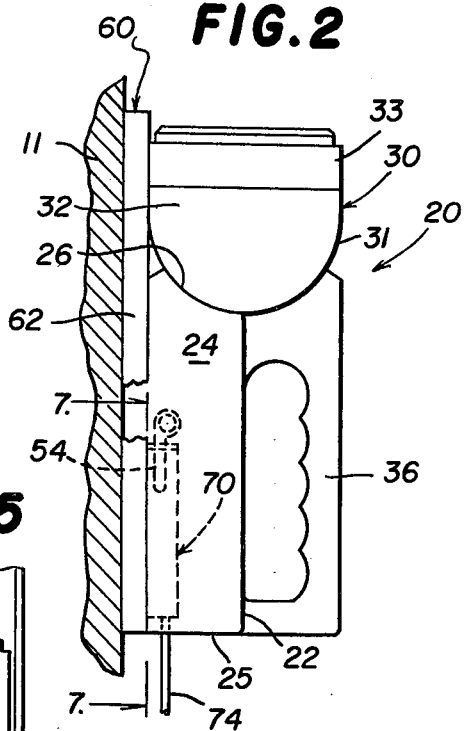
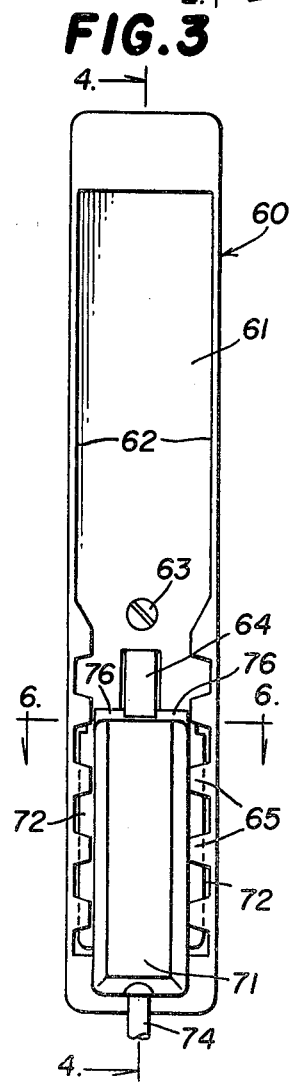
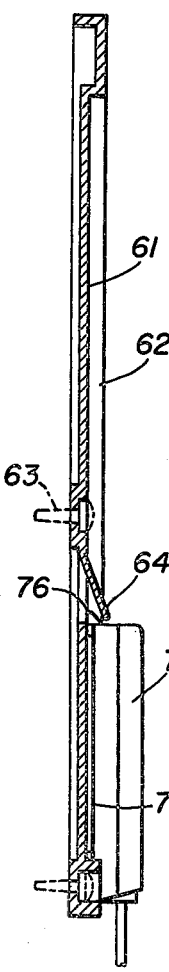
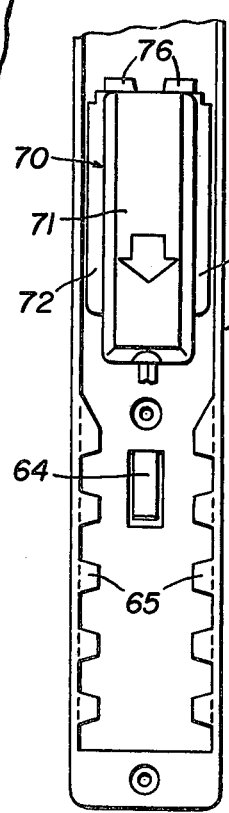
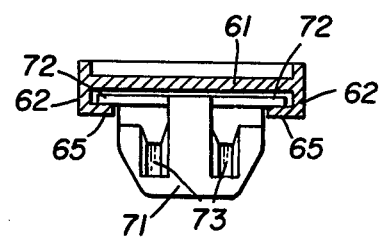
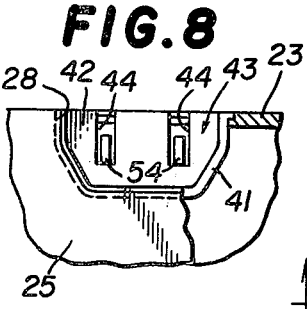
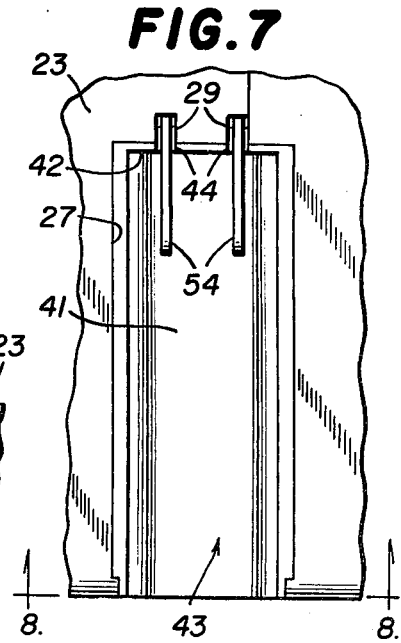

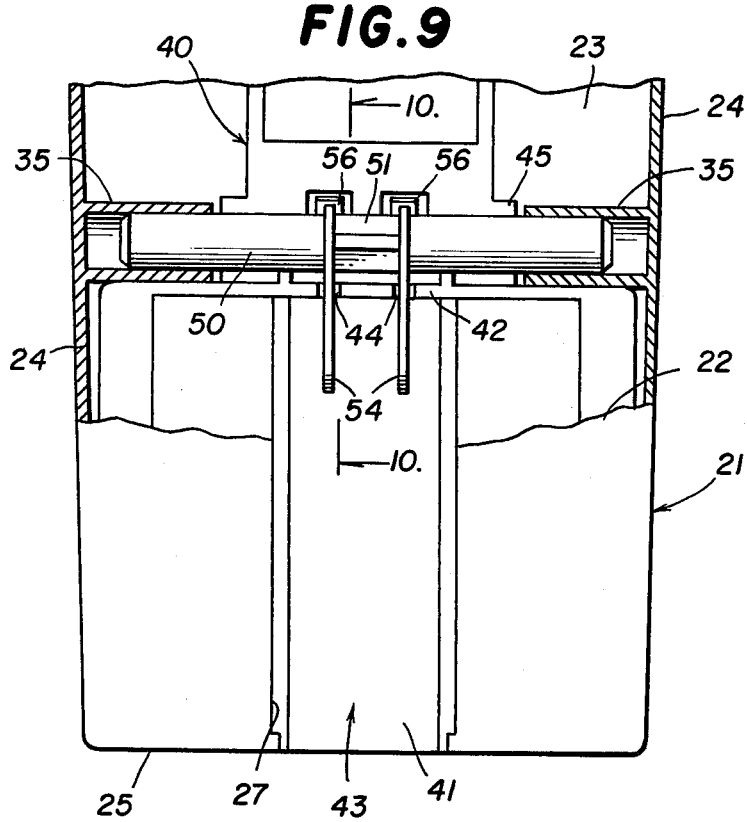
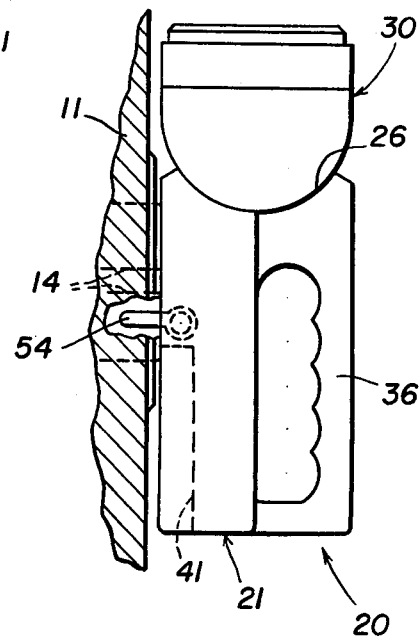
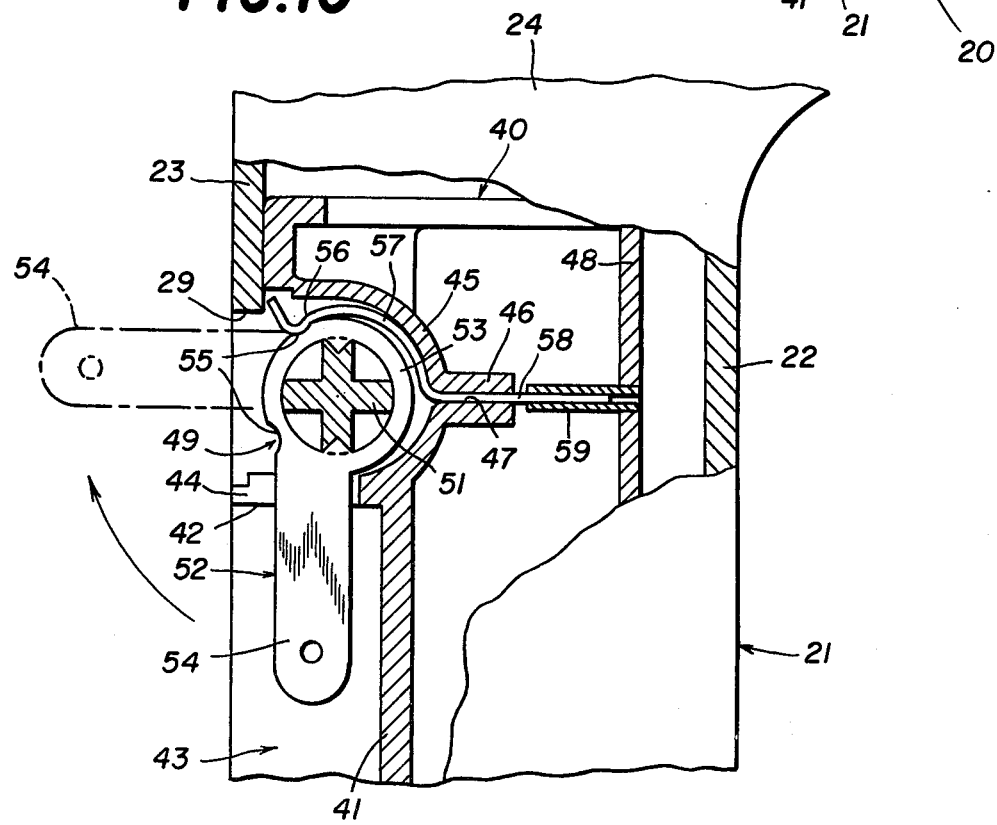

RECHARGEABLE BATTERY-POWERED FLASHLIGHT SYSTEM

BACKGROUND OF THE INVENTION

The present invention relates to devices powered by rechargeable batteries. In particular, the invention relates to a rechargeable battery-powered, handheld flashlight and a system for recharging the batteries thereof.

Typically, devices which are powered by rechargeable batteries have a housing provided with either male or female plug apparatus, the device commonly being provided with a recharging adaptor appliance which is plugged into the AC mains and connected to the housing plug.

It is known to provide rechargeable batteries with a male plug which can be plugged directly into the AC line without the use of an intervening adaptor appliance. It is also known to provide a rechargeable battery or battery-powered devices with plug contacts that are retractable within the device housing when not in use, but this requires complex mechanical linkage and typically occupies considerable space in the housing. It is also known to provide plug contacts on a battery-powered device which are individually foldable into recesses in the housing for storage when not in use. But such independently movable plug contacts result in a needlessly complex construction and do not afford optimum mating in associated receptacles. Furthermore, in all of these prior devices, only one use position is provided for the plug contacts.

SUMMARY OF THE INVENTION

It is a general object of the present invention to provide an improved recharging system for a rechargeable battery-operated device which avoids the disadvantages of prior systems while affording additional structural and operating advantages.

An important object of this invention is the provision of a rechargeable battery-powered device having plug contacts which are movable between two different recharing positions.

In connection with the foregoing object, it is another object of this invention to provide a device of the type set forth, wherein, in one position the plug contacts can be plugged directly into an AC wall outlet and in another position can be plugged into an associated receptacle fixture.

It is another object of this invention to provide a device of the type set forth wherein the plug contacts are rotatably movable as a unit between two use positions in which they are resiliently held.

In connection with the foregoing objects, it is another object of this invention to provide a recharging system including a device of the type set forth wherein the associated receptacle fixture provides support for the device during recharging.

These and other objects of the invention are attained by providing a rechargeable battery-powered device, the improvement comprising a housing for the device, a recharging plug including plural electrically conductive terminal prongs adapted to be electrically coupled to the device, and means mounting the prongs on the housing for rotation about a common axis between first and second positions.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a front elevational view of a recharging system for a flashlight, constructed in accordance with and embodying the features of the present invention, the flashlight being shown mounted in place on the wall bracket and receptacle fixture of the system;

FIG. 2 is a view in vertial section taken along the line 2—2 in FIG. 1, illustrating the system in side elevation, with a portion of the wall bracket broken away;

FIG. 3 is an enlarged, front elevational view of the wall bracket of the present invention with the receptacle fixture mounted in place thereon;

FIG. 4 is a view in vertical section taken along the line 4—4 in FIG. 3;

FIG. 5 is a fragmentary view similar to FIG. 3, illustrating the manner in which the receptacle fixture is inserted into the pocket on the wall bracket;

FIG. 6 is a further enlarged view in horizontal section taken along the line 6—6 in FIG. 3;

FIG. 7 is an enlarged, fragmentary view taken along the line 7—7 in FIG. 2, with the receptacle fixture removed;

FIG. 8 is a fragmentary view in partial section taken along the line 8—8 in FIG. 7;

FIG. 9 is an enlarged, fragmentary, rear elevational view of the flashlight housing, with portions thereof broken away more clearly to illustrate the plug mounting;

FIG. 10 is a further enlarged, fragmentary view in vertical section taken along the line 10—10 in FIG. 9 and illustrating the two positions of the flashlight housing plug; and FIG. 11 is a view similar to FIG. 2, illustrating the flashlight housing with its plug prongs plugged directly into an AC wall outlet.

DESCRIPTION OF THE PREFERRED EMBODIMENT

Referring now to FIGS. 1, 2 and 11 of the drawings, there is illustrated a recharging system, generally designated by the numeral 10, constructed in accordance with and embodying the features of the present invention. The recharging system 10 includes a rechargeable battery-powered flashlight 20, a wall-mounted bracket 60 and a receptacle fixture 70 which cooperate in a manner to be explained more fully below for affording two different recharging configruations for the flashlight 20. In one of those configurations, illustrated in FIG. 2, the flashlight 20 is plugged into the receptacle fixture 70 which is in turn carried on the bracket 60 which is mounted on a wall 11. In the other configuration illustrated in FIG. 11, the flashlight 20 is plugged directly into a socket 14 on an AC wall outlet 15.

Referring now also to FIGS. 7-10, the flashlight 20 includes a housing 21 which is generally box-like in shape and includes flat, generally rectangular front and rear walls 22 and 23 interconnected by opposed side walls 24, and closed at one end thereof by a generally rectangular end wall 25 and at the other end thereof by a part-cylindrical, concave end wall 26. The rear wall 23 has a rectangular opening 27 therein centrally thereof (FIGS. 7 and 9) which extends to and communicates with an opening 28 (FIG. 8) in the end wall 25. Also formed in the rear wall 23 and communicating with the upper end of the opening 27 are two rectangular slots 29 (FIGS. 7 and 10). The housing 21 contains one or more rechargeable batteries, together with a power supply and other suitable electronics (not shown) for recharging the batteries.

The flashlight 20 further comprises a head 30, preferably of one-piece plastic construction, having a part-cylindrical wall 31 closed at the opposite sides thereof by part-circular side walls 32. The curvature of the wall 31 matches that of the housing end wall 26, means (not shown) being provided for effecting a swivel mounting of the head 30 with respect to the housing 21, all as is described in greater detail in the copending application of Kenneth R. Fenne, Ser. No. 460,590, filed Jan. 24, 1983 and entitled "Battery Operated Flashlight with Swivel Head". The head 30 is provided with a cover assembly 33 including a generally rectangular bezel and associated lens, reflector, bulb and socket (not shown), all as described in greater detail in our copending application Ser. No. 460,176, filed Jan. 24, 1983 and entitled "Hand-Held Light with means for Controlling Beam Width".

Formed integrally with the inner surface of the rear wall 23, immediately above and respectively to either side of the upper end of the opening 27, are two generally cylindrical, coaxial brackets 35 (FIG. 9). Formed integrally with the front wall 22 of the housing 21 is a handle 36 which is provided with an ON-OFF switch 37 (FIG. 1).

Disposed in the housing 21 is an equipment frame 40 (FIGS. 9 and 10) which includes an elongated convex wall 41, which mates with the housing rear wall 23 and end wall 25 for closing the opening 27 along the sides thereof. Integral with the convex wall 41 at the upper end thereof is an end wall 42 which mates with the housing rear wall 23 for closing the opening 27 at the upper end thereof. Thus, the walls 41 and 42 cooperate to form a reentrant portion of the housing rear wall 23 which defines a recess 43 which opens to the rear wall 23 and the end wall 25. Formed in the end wall 42 are two rectangular slots 44 which respectively communicate with the slots 29 in the housing rear wall 23. Integral with the end wall 42 immediately thereabove is a part-cylindrical retainer 45 which cooperates with the rear wall 23 of the housing 21 to define a chamber 49 (FIG. 10). Integral with the retainer 45 is a projection 46 which extends inwardly of the housing 21 and has an opening 47 therethrough communicating with the chamber 49. Also disposed in the housing 21 is a printed circuit board 48.

Disposed in the chamber 49 is an elongated generally cylindrical axle 50, having the opposite ends thereof respectively rotatably received in the brackets 35. The axle 50 has a central section 51, substantially cruciform in transverse cross section, which serves as a spacer between two electrically conductive male plug terminals 52, each having a generally circular end 53 fixedly secured to the axle 50 and a prong 54 projecting from the axle 50 substantially perpendicular to the axis thereof. More specifically, the prongs 54 are disposed parallel to each other for extension outwardly through the slots 29 in the housing rear wall 23 and the slots 44 in the frame end wall 42.

Each of the circular ends 53 of the plug terminals 52 has two detent recesses 55 circumferentially spaced apart thereon for receiving therein the projections 56 of two resilient spring contacts 57, each of which has a leg 58 extending through the opening 47 in the projection 46 and engaged with a corresponding terminal 59 on the circuit board 48. It will be noted that the projections 56 are respectively urged into sliding contact with the circumferential surfaces of the circular plug terminal ends 53 for accommodating rotation of the plug terminals 52 with the axle 50, while maintaining electrical contact with the plug terminals 52.

Referring to FIG. 10, it can be seen that the plug terminals 52 are rotatable between a first position illustrated in solid line, wherein the prongs 54 project downwardly through the slots 44 into the recess 43, substantially parallel to the housing rear wall 23, and a second position illustrated in broken line, wherein the prongs 54 project rearwardly through the slots 29 substantially perpendicular to the housing rear wall 23 and out of the recess 43. The detent recesses 55 are so positioned that when the plug terminals 52 are in each of these two positions, the contact projections 56 will be seated in corresponding ones of the detent recesses 55 for inhibiting rotation of the plug terminals 52.

Referring now also to FIGS. 3 through 6 of the drawings, the bracket 60 is preferably of one-piece molded plastic and includes a flat, rectangular main wall 61 provided around the perimeter thereof with an upstanding peripheral flange 62. The bracket 50 is adapted to be fastened to an associated wall 11 or other supporting surface, as by screws 63 or other suitable fasteners. Struck from the main wall 61 and projecting forwardly therefrom toward one end thereof is a flexible, resilient tab 64. Integral with the peripheral flange 62 and projecting laterally inwardly therefrom along opposite sides of the main wall 61 are a plurality of spaced-apart retaining fingers 65 disposed substantially parallel to the main wall 61 and cooperating therewith and with the peripheral flanges 62 to define a pocket at the lower end of the bracket 60 for receiving therein the receptacle fixture 70.

More specifically, the receptacle fixture 70 includes an elongated, generally rectangular body 71 provided along the opposite sides thereof with laterally outwardly extending side flanges 72 which are substantially flush with the rear wall of the body 71. The receptacle fixture 70 has a pair of socket openings 73 (FIG. 6) at one end thereof, the other end thereof being connected to an elongated electrical cord 74 which is provided at its other end with a standard plug 75 (FIG. 1) for plugging into a socket 14 of an AC wall outlet 15. Preferably, the body 71 is provided at its upper end, adjacent to the opening 73, with a pair of spaced-apart centering tabs 76.

In operation, the flashlight 20 normally has the plug terminals 52 thereof folded down into the recess 43 in the position illustrated in solid line in FIG. 10. In this position, the plug terminals 52 are out of the way, and the rear wall 23 of the housing 21 can be rested upon a table or other horizontal support surface without interference by the plug terminals 52. When the rechargeable batteries of the flashlight 20 need recharging, this can be accomplished in either one of two different modes. In one of these modes, illustrated in FIG. 11, the plug terminals 52 are rotated up to the position illustrated in broken line in FIG. 10, against the urging of the spring contacts 57, the projections 56 being cammed out of one set of the detent recesses 55 as the plug terminals 52 leave the solid line position of FIG. 10, and snapping into the other set of detent recesses 55 when the plug terminals arrive in the broken-line position of FIG. 10. In this latter position, the prongs 54 of the plug terminals 52 can be plugged directly into a socket 14 of an AC wall outlet 15 for recharging of the batteries. In this mode, the flashlight 20 is supported solely by the frictional engagement of the prongs 54 in the socket 14.

Since the rechargeable batteries may make the flashlight 20 relatively heavy, the alternative recharging mode utilizes the bracket 60 and the receptacle fixture 70 to provide more solid support for the flashlight 20. In this mode of recharging, the male plug terminals 52 are left in their normal position illustrated in solid line in FIG. 10, projecting into the recess 43. The bracket 60 is mounted in any convenient location on the wall 11, peferably near an AC outlet 15. The receptacle fixture 70 is then inserted in the bracket 60 in the manner illustrated in FIG. 5. More spcifically, the receptacle fixture 70 is disposed with the socket openings disposed upwardly, and the rear wall of the body 71 is laid flat against the front surface of the bracket main wall 61 above the pocket defined by the retaining finger 64. The body 71 is then slid downwardly along the main wall 61 in the direction of the arrow in FIG. 5, the tab 64 being deflected rearwardly to accommodate this movement, and the side flanges 72 in the body 71 respectively sliding beneath the two rows of retaining fingers 65. The body 71 is moved in this way to a mounted position illustrated in FIG. 3, wherein the lower ends of the side flanges 72 bottom out on the lower portion of the bracket peripheral flange 62. In this position, the upper end of the body 71 is disposed just beneath the lower end of the tab 64, permitting the tab 64 to snap back to its normal position, between the centering tabs 76. Thus, it will be appreciated that the tab 64 prevents accidental retrograde movement of the body 71. Lateral movement of the body 71 is prevented by the peripheral flange 62 of the bracket 60 and by the cooperation of the tab 64 with the centering tabs 76, while the retaining fingers 65 prevent the body 71 from being pulled forwardly away from the bracket 60.

In this mounted configuration the front portion of the body 71 projects forwardly well beyond the plane of the retaining fingers 65, as illustrated in FIG. 4. The flashlight housing 21 is then slid downwardly over the receptacle fixture 70, with the body 71 being received in the recess 43, until the prongs 54 of the plug terminals 52 respectively engage in the socket openings 73 of the receptacle fixture 70 (see FIG. 2). In this configuration, the end wall 42 at the top of the recess 43 rests on the top wall of the receptacle fixture body 71 for providing a firm support for the flashlight housing 21. The nesting of the receptacle body 71 in the recess 43 of the flashlight hosuing 21 permits the rear wall 23 of the housing 21 to fit flush up against the bracket 60. Thus, any pivotal movement of the flahslight housing 21 about the axis of the axle 50 is effectively prevented. It will be appreciated that, even when recharging of the batteries is not needed, the flashlight 20 can be mounted on the bracket 60 and receptacle fixture 70 for convenient storage when not in use. When it is desired to remove the receptacle fixture 70 from the bracket 60, the tab 64 is manually depressed to allow the body 71 to pass thereover and be slid upwardly out of the pocket on the bracket 60. It will be understood that when thus disassembled from the bracket 60, the receptacle fixture 70 can be used as a standard extension cord.

In a constructional model of the present invention, the flashlight housing 21 is preferably formed of two molded plastic parts held together by screws or other suitable fasteners. Similarly, the equipment frame 40 is preferaby a molded plastic part. The axle 50 may be formed in three sections, including two circular cylindrical end sections and the center section 51.

From the foregoing, it can be seen that there has been provided an improved rechargeable battery-powered flashlight and system for recharging same, characterized by plug terminals in the flahslight which are rotatable as a unit between a projecting position for plugging directly into an AC wall outlet and a recessed position out of the way for normal use and for plugging into a sepcial receptacle fixture for mounting on a wall bracket.

We claim:

1. In a rechargeable battery-powered device, the improvement comprising a housing for the device, a recharging plug including plural electrically conductive terminal prongs adapted to be electrically coupled to the device, and means mounting said prongs on said housing for rotation about a common axis between first and second positions, such that said prongs project externally of said housing in both the first and second positions thereof.

2. The device of claim 1, wherein said housing has a reentrant portion defining a recess therein, said prongs projecting into said recess in one of said first and second positions.

3. In a rechargeable battery-powered device, the improvement comprising a housing for the device, a recharging plug including plural electrically conductive terminal prongs, means mounting said prongs on said housing for rotation between first and second positions, each of said prongs having an electrically conductive contact portion with two spaced-apart detent recesses therein, and a plurality of flexible electrically conductive contacts adapted to be coupled to the device and respectively resiliently urged into sliding engagement with the contact portions of said prongs for maintaining electrical contact therewith while accommodating rotational movement thereof, said contacts being engageable in said detent recesses when said prongs are in the first and second positions thereof for resiliently inhibiting rotational movement of said prongs.

4. The device of claim 3, wherein said plug comprises a pair of parallel prongs.

5. The device of claim 3, wherein each of said contact portions is arcuate in shape.

6. The device of claim 3, wherein said mounting means comprises an elongated shaft, said prongs being fixedly secured to said shaft.

7. The device of claim 6, wherein said housing includes two sockets formed therein, the opposite ends of said shaft being respectively rotatably received in said sockets.

8. The device of claim 6, wherein said prongs extend substantially perpendicular to said axis.

9. A recharging system for a rechargeable battery-operated device comprising a housing for the device, said housing having a reentrant portion defining a recess, a recharging plug adapted to be electrically coupled to the device and projecting from said housing, means mounting said plug for movement between a first position projecting into said recess and a second position, and receptacle means adapted to be coupled to an associated source of AC electric power and receivable in said recess for electrical connection with said plug in the first position thereof.

10. The system of claim 9, wherein said housing has an opening therein, said mounting means being disposed within said housing and said plug projecting outwardly through said opening.

11. The system of claim 9, wherein said plug in the second position thereof projects outwardly away from said recess.

12. The system of claim 9, and further including a support bracket for holding said receptacle means, said receptacle means when received in said recess being cooperable with said support bracket for supporting said housing.

13. The system of claim 12, wherein said support bracket defines a pocket for receiving said receptacle means therein.

14. The system of claim 13, wherein said support bracket includes resilient deflectable latch means cooperating with said receptacle means to hold it in said pocket.

15. The system of claim 9, wherein said mounting means includes detent means for inhibiting movement of said plug when it is in either of said first and second positions.

16. The system of claim 9, wherein said mounting means accommodates rotational movement of said plug between the first and second positions thereof.

17. A recharging system for a rechargeable battery-operated device comprising a housing for the device, said housing having a reentrant portion defining a recess, a recharging plug adpated to be electrically coupled to the device and projecting from said housing into said recess, and receptacle means adapted to be coupled to an associated source of AC electric power and receivable in said recess for electrical connection with said plug.

* * * * *